(12) United States Patent
Zhang et al.

(10) Patent No.: US 10,448,082 B2
(45) Date of Patent: Oct. 15, 2019

(54) INFORMATION EXCHANGING METHOD AND DEVICE, AUDIO TERMINAL AND COMPUTER-READABLE STORAGE MEDIUM

(71) Applicant: Baidu Online Network Technology (Beijing) Co., Ltd., Beijing (CN)

(72) Inventors: Zhike Zhang, Beijing (CN); Bin Huang, Beijing (CN); Xinjie Wang, Beijing (CN); Zhaoji Xu, Beijing (CN); Zhihua Wang, Beijing (CN); Fei Wang, Beijing (CN); Wenlin Dong, Beijing (CN); Leilei Gao, Beijing (CN); Xiangtao Jiang, Beijing (CN); Gaofei Cheng, Beijing (CN); Zhipeng Wu, Beijing (CN); Qin Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/854,431

(22) Filed: Dec. 26, 2017

(65) Prior Publication Data

US 2019/0149872 A1 May 16, 2019

(30) Foreign Application Priority Data

Nov. 16, 2017 (CN) .......................... 2017 1 1136412

(51) Int. Cl.
*H04N 21/422* (2011.01)
*H04L 12/28* (2006.01)
(Continued)

(52) U.S. Cl.
CPC ....... *H04N 21/42203* (2013.01); *G06F 3/167* (2013.01); *G06F 16/433* (2019.01); *H04L 12/2809* (2013.01)

(58) Field of Classification Search
None
See application file for complete search history.

(56) References Cited

U.S. PATENT DOCUMENTS 6,230,162 B1 * 5/2001 Kumar ............... H04N 7/17318
382/240
6,867,820 B2 * 3/2005 Jin ..................... H04N 5/44513
348/705

(Continued)

FOREIGN PATENT DOCUMENTS

CN         1684089 A    10/2005
CN       102057651 A     5/2011
(Continued)

OTHER PUBLICATIONS

Chinese Office Action dated Jul. 19, 2018 issued in Chinese Application No. CN201711136412.8.
(Continued)

*Primary Examiner* — An Son P Huynh
(74) *Attorney, Agent, or Firm* — Arent Fox, LLP (57) ABSTRACT

An information exchanging method, an information exchanging device, and a terminal are provided. The information exchanging method is applied to an audio terminal. The method includes: receiving an input instruction from a user; generating a content request message according to the input instruction and a connection state identifier of the audio terminal, and sending the content request message to a server, wherein the connection state identifier indicates whether the audio terminal is connected to the video display device; and receiving a content request response message returned by the server. Thus, voice instructions input by the user can be more accurately performed according to the connection state of the audio device.

11 Claims, 4 Drawing Sheets

(51) Int. Cl.
*G06F 3/16* (2006.01)
*G06F 16/432* (2019.01)

(56) References Cited

U.S. PATENT DOCUMENTS

| | | | | |
|---|---|---|---|---|
| 8,776,120 | B2* | 7/2014 | Lee | H04N 21/485 |
| | | | | 348/734 |
| 8,863,196 | B2* | 10/2014 | Patil | H04N 21/42216 |
| | | | | 725/109 |
| 10,123,186 | B2* | 11/2018 | Koch | H04M 7/0027 |
| 2002/0174430 | A1* | 11/2002 | Ellis | G11B 27/005 |
| | | | | 725/46 |
| 2003/0149988 | A1* | 8/2003 | Ellis | H04N 5/44543 |
| | | | | 725/87 |
| 2005/0125819 | A1* | 6/2005 | Ono | H04H 60/80 |
| | | | | 725/14 |
| 2006/0080408 | A1* | 4/2006 | Istvan | G06F 17/30861 |
| | | | | 709/219 |
| 2007/0157260 | A1* | 7/2007 | Walker | H04N 7/163 |
| | | | | 725/86 |
| 2008/0066135 | A1* | 3/2008 | Brodersen | G06F 3/0236 |
| | | | | 725/134 |
| 2008/0235731 | A1* | 9/2008 | Bryant | H04N 5/44543 |
| | | | | 725/44 |
| 2009/0061841 | A1* | 3/2009 | Chaudhri | H04M 1/72527 |
| | | | | 455/420 |
| 2009/0125971 | A1* | 5/2009 | Belz | H04N 7/163 |
| | | | | 725/153 |
| 2009/0187967 | A1* | 7/2009 | Rostaing | G06F 3/165 |
| | | | | 726/1 |
| 2009/0249413 | A1* | 10/2009 | Karaoguz | H04N 21/235 |
| | | | | 725/105 |
| 2009/0273705 | A1* | 11/2009 | Matsumoto | H04N 5/64 |
| | | | | 348/383 |
| 2010/0153985 | A1* | 6/2010 | Dey | H04N 21/41407 |
| | | | | 348/553 |
| 2010/0154023 | A1* | 6/2010 | Dey | H04N 21/41407 |
| | | | | 725/151 |
| 2010/0251292 | A1* | 9/2010 | Srinivasan | H04H 20/57 |
| | | | | 725/37 |
| 2010/0333135 | A1* | 12/2010 | Lau | H04N 5/4403 |
| | | | | 725/39 |
| 2011/0016492 | A1* | 1/2011 | Morita | H04N 5/44543 |
| | | | | 725/58 |
| 2011/0069940 | A1* | 3/2011 | Shimy | G11B 27/105 |
| | | | | 386/296 |
| 2011/0078717 | A1* | 3/2011 | Drummond | H04N 21/4586 |
| | | | | 725/14 |
| 2011/0138064 | A1* | 6/2011 | Rieger | G06F 17/30905 |
| | | | | 709/228 |
| 2011/0164175 | A1* | 7/2011 | Chung | H04N 21/4126 |
| | | | | 348/468 |
| 2012/0200774 | A1* | 8/2012 | Ehlers, Sr. | H04N 21/4104 |
| | | | | 348/515 |
| 2013/0027613 | A1* | 1/2013 | Kim | H04N 21/426 |
| | | | | 348/563 |
| 2013/0145403 | A1* | 6/2013 | Sofos | H04N 21/4122 |
| | | | | 725/62 |
| 2013/0173765 | A1* | 7/2013 | Korbecki | H04N 21/42209 |
| | | | | 709/221 |
| 2014/0365787 | A1* | 12/2014 | Sagar | G06F 1/3203 |
| | | | | 713/300 |
| 2016/0345062 | A1* | 11/2016 | Klappert | H04N 21/4667 |
| 2018/0146231 | A1* | 5/2018 | Saeedasr | H04N 21/4122 |

FOREIGN PATENT DOCUMENTS

| | | |
|---|---|---|
| CN | 102098553 A | 6/2011 |
| CN | 203775389 U | 8/2014 |
| CN | 104378710 A | 2/2015 |
| CN | 106231347 A | 12/2016 |
| CN | 107146607 A | 9/2017 |
| JP | 2008250587 A | 10/2008 |
| JP | 2010206568 A | 9/2010 |
| JP | 2011215189 A | 10/2011 |
| WO | WO 2012/163122 A1 | 12/2012 |

OTHER PUBLICATIONS

Japan Notice of Reasons for Refusal corresponding to Japanese Application No. 2018-141149, dated Aug. 23, 2019.

* cited by examiner

INFORMATION EXCHANGING METHOD AND DEVICE, AUDIO TERMINAL AND COMPUTER-READABLE STORAGE MEDIUM

CROSS-REFERENCE TO RELATED APPLICATION

The present application claims the benefit of priority to Chinese Patent Application No. 201711136412.8, filed before the State Intellectual Property Office on Nov. 16, 2017, and entitled "Information Exchanging Method and Device, Audio Terminal and Computer-Readable Storage Medium", which is incorporated in the present application by reference in its entirety

TECHNICAL FIELD

The present application relates to the field of communications, and in particular, to an information exchanging method and device, an audio terminal, and a computer-readable storage medium.

BACKGROUNDS

At present, all kinds of smart appliances are widely used in people's daily life. Smart speaker box is an upgraded product of traditional speaker boxes, which is a tool for users to access the Internet by voice, such as on-demand playing songs, online shopping, or learning about the weather. It can also control smart home devices, such as drawing a curtain, setting the temperature of a refrigerator, raising the temperature of a water heater in advance. That is, smart speaker boxes can work independently or be connected with other smart home devices and work together with them. Therefore, when the smart speaker box receives a voice instruction from the user, it is an urgent problem to be solved that how to enable the voice instruction to be accurately executed by the box.

SUMMARY

The embodiments of the present application provide an information exchanging method and device, an audio terminal, and a computer-readable storage medium, so as to at least solve the above technical problems in the existing technology.

According to a first aspect, an embodiment of the present application provides an information exchanging method applied to an audio terminal and including:
receiving an input instruction from a user;
generating a content request message according to the input instruction and a connection state identifier of the audio terminal, and sending the content request message to a server, wherein the connection state identifier indicates whether the audio terminal is connected to a video display device; and
receiving a content request response message returned by the server.

With reference to the first aspect, in a first implementation of the first aspect of the present application, the receiving the content request response message returned by the server includes:
receiving audio information returned by the server in a case that the connection state identifier indicates that the audio terminal is not connected to the video display device; and
receiving video information returned by the server in a case that the connection state identifier indicates that the audio terminal is connected to the video display device.

With reference to a first implementation of the first aspect, in a second implementation of the first aspect of the present application, the video information includes a video list searched by the server according to the input instruction.

With reference to the first implementation of the first aspect, in a third implementation of the first aspect of the present application, in a case that the connection state identifier indicates that the audio terminal is connected to the video display device, the method further includes: sending the received video information to the video display device, wherein the video display device obtains video content from a video server according to the video information.

With reference to the first aspect, the first implementation of the first aspect, the second implementation of the first aspect, or the third implementation of the first aspect, in a fourth implementation of the first aspect of the present application, the video display device includes any one of a smart TV, a television box, and a screen projection tool.

According to a second aspect, an embodiment of the present application provides an information exchanging method applied to a server and including:
receiving a content request message from an audio terminal, wherein the content request message comprises an input instruction received by the audio terminal from a user and a connection state identifier for indicating whether the audio terminal is connected to a video display device;
searching the requested content in the server according to the content request message to obtain a search result; and
generating a content request response message according to the search result, and sending the content request response message to the audio terminal.

With reference to the second aspect, in a first implementation of the second aspect of the present application, the searching the requested content in the server according to the content request message to obtain the search result includes:
searching in audio content according to the input instruction of the user in a case that the connection state identifier indicates that the audio terminal is not connected to the video display device; and
searching in video content according to the input instruction of the user in a case that the connection state identifier indicates that the audio terminal is connected to the video display device.

With reference to the first implementation of the second aspect, in a second implementation of the second aspect of the present application, in a case that the connection state identifier indicates that the audio terminal is connected to the video display device, the content request response message includes a searched video list.

According to a third aspect, an embodiment of the present application provides an information exchanging device, including:
a first receiving module configured to receive an input instruction from a user;
a first sending module configured to generate a content request message according to the input instruction and a connection state identifier of an audio terminal, and send the content request message to a server, wherein the connection state identifier indicates whether the audio terminal is connected to a video display device; and a second receiving module configured to receive a content request response message returned by the server.

With reference to the third aspect, in a first implementation of the third aspect of the present application, the second receiving module is further configured to receive audio information returned by the server in a case that the connection state identifier indicates that the audio terminal is not connected to the video display device; and receive video information returned by the server in a case that the connection state identifier indicates that the audio terminal is connected to the video display device.

With reference to the first implementation of the third aspect, in a second implementation of the third aspect of the present application, in a case that the connection state identifier indicates that the audio terminal is connected to the video display device, the video information includes a video list searched by the server according to the input instruction.

With reference to the first implementation of the third aspect, in a third implementation of the third aspect of the present application, in a case that the connection state identifier indicates that the audio terminal is connected to the video display device, the device further includes:

a second sending module configured to send the received video information to the video display device, wherein the video display device obtains video content from a video server according to the video information.

According to a fourth aspect, an embodiment of the present application provides an information exchanging device, including:

a third receiving module configured to receive a content request message from an audio terminal, wherein the content request message includes an input instruction received by the audio terminal from a user and a connection state identifier for indicating whether the audio terminal is connected to a video display device;

a searching module configured to search the requested content in the server according to the content request message to obtain a search result; and a third sending module configured to generate a content request response message according to the search result, and send the content request response message to the audio terminal.

With reference to the fourth aspect, in a first implementation of the fourth aspect of the present application, the searching module is further configured to: search in audio content according to the input instruction of the user in a case that the connection state identifier indicates that the audio terminal is not connected to the video display device; and search in video content according to the input instruction of the user in a case that the connection state identifier indicates that the audio terminal is connected to the video display device.

With reference to the first implementation of the fourth aspect, in a second implementation of the fourth aspect of the present application, in a case that the connection state identifier indicates that the audio terminal is connected to the video display device, the content request response message includes a searched video list.

The functions may be implemented by hardware or by software. The hardware or software includes one or more modules corresponding to the functions described above.

In one possible design, the structure of the audio terminal includes a processor and a memory, wherein the memory is configured to store a program that supports an audio terminal to execute the information exchanging method in the first aspect, and the processor is configured to execute the program stored in memory. The audio terminal may further include a communication interface for the audio terminal to communicate with other devices or communication networks.

In one possible design, the structure of the server includes a processor and a memory, wherein the memory is configured to store a program that supports the server to execute the information exchanging method in the second aspect, and the processor is configured to execute the program stored in the memory. The server may also include a communication interface for the server to communicate with other devices or communication networks.

According to a fifth aspect, an embodiment of the present application provides a computer-readable storage medium for storing computer software instructions used by an information exchanging device, including a program involved in the audio terminal for executing the information exchanging method in the first aspect.

According to a sixth aspect, an embodiment of the present application provides a computer-readable storage medium for storing computer software instructions used by an information exchanging device, including a program involved in the server for executing the information exchanging method in the second aspect.

One of the above technical solutions has the following advantages or beneficial effects:

Through the information exchanging method of the present application, the content request message sent to the server carries a connection state identifier, and the server can search corresponding multimedia content according to the connection state identifier and return it to the audio terminal. Thus, the voice instruction input by the user can be more accurately performed according to the connection state of the audio device.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
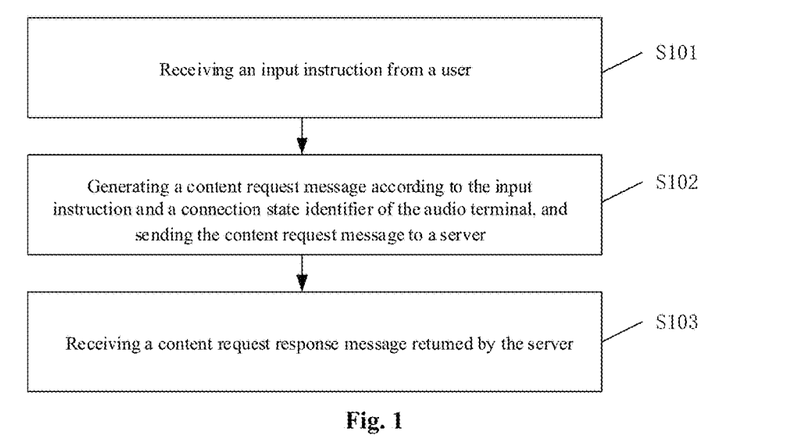
FIG. 1 is a flow chart of an information exchanging method according to an embodiment of the present application.

FIG. 1 shows a flowchart of an information exchanging method according to an embodiment of the present application. The information exchanging method shown in FIG. 1 is applied to an audio terminal, and may include the following steps.

S101, receiving an input instruction from a user;

S102, generating a content request message according to the input instruction and a connection state identifier of the audio terminal, and sending the content request message to a server, wherein the connection state identifier indicates whether the audio terminal is connected to a video display device;

S103, receiving a content request response message returned by the server.

Through the information exchanging method of the present application, the content request message sent to the server carries a connection state identifier, and the server can search the corresponding multimedia content according to the connection state identifier and return it to the audio terminal. Thus, the voice instructions input by the user can be more accurately performed according to the connection state of the audio device.

Figure 2:
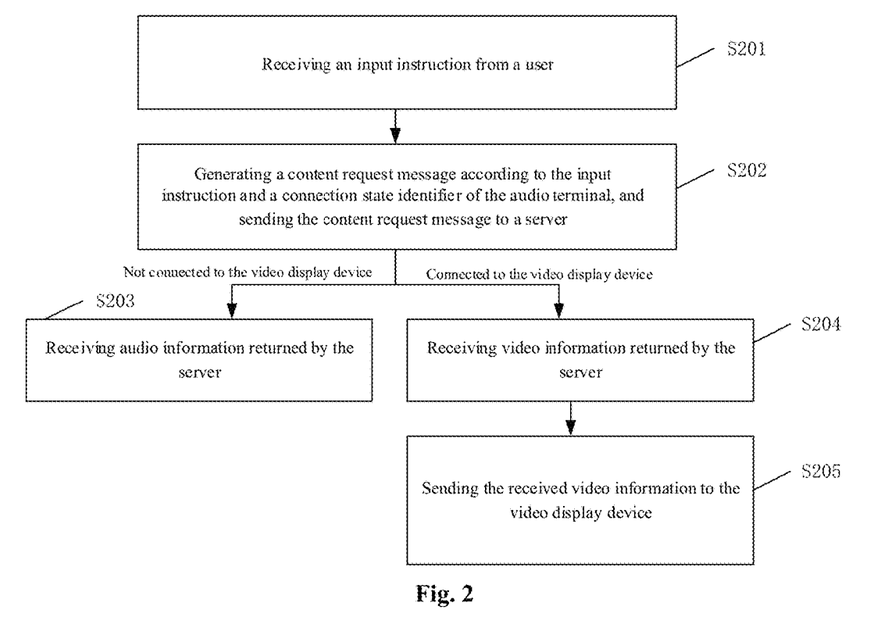
FIG. 2 is a flow chart of an information exchanging method according to another embodiment of the present application.

FIG. 2 shows a flowchart of an information exchanging method according to another embodiment of the present application. As shown in FIG. 2, an information exchanging method can be applied to an audio terminal such as a smart speaker box, and may include the following steps.

S201, receiving an input instruction from a user.

In an embodiment of the present application, the user expresses requirements regarding on-demand video or audio by performing voice interaction with the audio terminal. For example, the audio terminal may include a microphone, and may collect voice instructions input by the user through the microphone.

S202, generating a content request message according to the input instruction and a connection state identifier of the audio terminal, and sending the content request message to a server, wherein the connection state identifier indicates whether the audio terminal is connected to a video display device.

In an embodiment of the present application, after the voice instruction input by the user is received by the audio terminal, the connection state of the audio terminal with the video display device is checked. The content request message is generated by the audio terminal according to the checking result and the voice instruction input by the user, and the generated content request message is sent to the server. The content request message includes a connection state identifier for indicating whether the audio terminal is connected to the video display device.

The video display device may be any one of a smart TV, a television box, and a screen projection tool. A screen projection tool is a device that can project videos, pictures, and the like in mobile devices such as mobile phones and iPads to a large-screen display device such as a television, a projector, and a computer monitor for watching, for example, the tool may be the TV Guo.

S203, receiving audio information returned by the server in a case that the connection state identifier indicates that the audio terminal is not connected to the video display device.

In a case that the connection state identifier indicates that the audio terminal is not connected to the video display device, the audio terminal operates independently. Therefore, video cannot be played through the audio terminal. In this case, audio information can be returned from the server based on the voice instruction of the user.

S204, receiving video information returned by the server in a case that the connection state identifier indicates that the audio terminal is connected to the video display device.

In a case that the connection state identifier indicates that the audio terminal is connected to the video display device, the audio terminal and the video display device work together, and this time, video may be played. Therefore, the video-on-demand content can be returned from the server according to the voice instruction of the user.

When a plurality of results are searched at the server according to the voice instruction of the user, a video list is generated based on the plurality of search results. The video information may include the video list.

For example, the user inputs "a movie Starring Stephen Chow" by voice, and the audio terminal is confirmed to be connected to a screen projection tool. In this case, all the major Stephen Chow movies are searched by the server based on the voice input and a video list is generated based on the search results. And then, the video list is sent to the audio terminal.

S205, sending the received video information to the video display device, wherein the video display device obtains video content from a video server according to the video information.

In an embodiment of the present application, the video list received from the server is transmitted to the video display device in a case that the connection state identifier indicates that the audio terminal is connected to the video display device. After receiving the video list, the video display device obtains video content from a video server according to the video list, and displays the obtained video content on a display.

For example, after the audio terminal receives the video list about Stephen Chow's movies, the video list is sent to a screen projection tool connected to the audio terminal. The screen projection tool obtains video content from a video server according to the video list, that is, obtains Stephen Chow's movies listed in the video list. Finally, the obtained Stephen Chow's movie is projected onto a display connected to the screen projection tool for selecting and watching by the user.

Through the information exchanging method of the present application, the content request message sent to the server carries a connection state identifier, and the server can search corresponding multimedia content according to the connection state identifier and return it to the audio terminal. Thus, the voice instructions input by the user can be more accurately performed according to the connection state of the audio device.

In addition, the user can control the video display device by performing voice communication with the audio terminal when the audio terminal is connected to the video display device. Thus, without controlling TV remotely, video search and control can be realized directly by voice, thereby achieving cross-device interaction.

Figure 3:
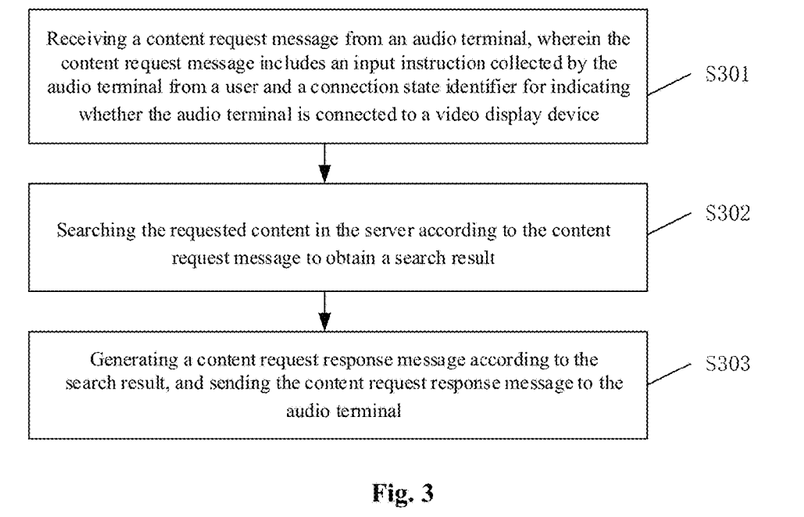
FIG. 3 is a flow chart of an information exchanging method according to another embodiment of the present application.

FIG. 3 shows a flowchart of an information exchanging method according to another embodiment of the present application. The information exchanging method with reference to FIG. 3 is applied to a server. The method may include the following steps.

S301, receiving a content request message from an audio terminal, wherein the content request message includes an input instruction collected by the audio terminal from a user and a connection state identifier for indicating whether the audio terminal is connected to a video display device.

S302, searching the requested content in the server according to the content request message to obtain a search result.

After receiving the content request message, the server analyzes the content request message to obtain the connection state identifier. In a case that the connection state identifier indicates that the audio terminal is not connected to the video display device, the server searches the desired content of the user in the audio content according to the input instruction of the user. In a case that the connection state identifier indicates that the audio terminal is connected to the video display device, the server searches the desired content of the user from the video content according to the input instruction of the user.

S303, generating a content request response message according to the search result, and sending the content request response message to the audio terminal.

In an embodiment, in a case that the connection state identifier indicates that the audio terminal is connected to the video display device, the content request response message includes a searched video list.

Figure 4:
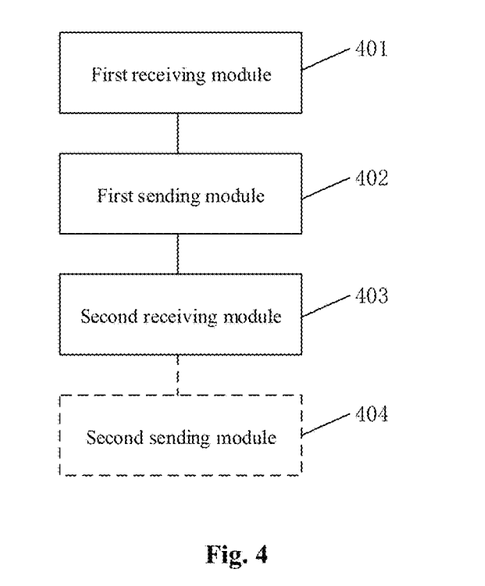
FIG. 4 is a structural block diagram of an information exchanging device according to an embodiment of the present application.

FIG. 4 shows a structural block diagram of an information exchanging device according to an embodiment of the present application. As shown in FIG. 4, the information exchanging device includes:

a first receiving module 401 configured to receive an input instruction from a user;

a first sending module 402 configured to generate a content request message according to the input instruction and a connection state identifier of an audio terminal, and send the content request message to a server, wherein the connection state identifier indicates that whether the audio terminal is connected a video display device; and a second receiving module 403 configured to receive a content request response message returned by the server.

In an embodiment of the present application, the second receiving module 403 is further configured to: receive audio information returned by the server in a case that the connection state identifier indicates that the audio terminal is not connected to the video display device; and receive video information returned by the server in a case that the connection state identifier indicates that the audio terminal is connected to the video display the device.

In a case that the connection state identifier indicates that the audio terminal is connected to the video display device, the video information may include a video list searched by the server according to the input instruction.

In an embodiment of the present application, in a case that the connection state identifier indicates that the audio terminal is connected to the video display device, the information exchanging device may further include: a second sending module 404 configured to send the received video information to the video display device, wherein the video display device obtains video content from a video server according to the video information.

Figure 5:
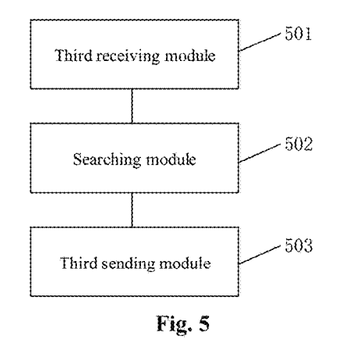
FIG. 5 is a structural block diagram of an information exchanging device according to another embodiment of the present application.

FIG. 5 shows a structural block diagram of an information exchanging device according to another embodiment of the present application. Referring to FIG. 5, the information exchanging device may include:

a third receiving module 501 configured to receive a content request message from an audio terminal, wherein the content request message includes an input instruction collected by the audio terminal from a user and a connection state identifier for indicating whether the audio terminal is connected to a video display device;

a searching module 502 configured to search the requested content in the server according to the content request message to obtain a search result; and a third sending module 503 configured to generate a content request response message according to the search result, and send the content request response message to the audio terminal.

In an embodiment of the present application, the searching module 502 is further configured to: search in audio content according to the input instruction of the user in a case that the connection state identifier indicates that the audio terminal is not connected to the video display device; and search in video content according to the input instruction of the user in a case that the connection state identifier indicates the audio terminal is connected to the video display device.

In an embodiment of the present application, in a case that the connection state identifier indicates that the audio terminal is connected to the video display device, the content request response message includes a searched video list.

Figure 6:
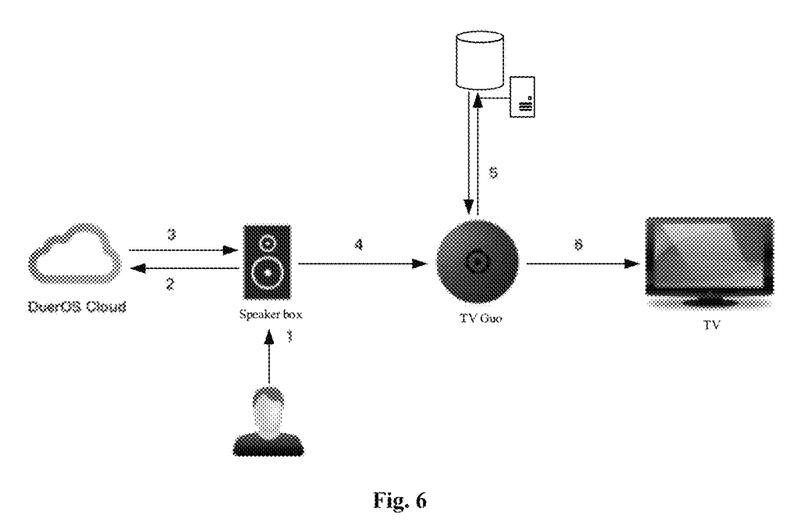
FIG. 6 is a structural block diagram of an information exchanging device according to another embodiment of the present application.

An implementation of the information exchanging device according to the above embodiment of the present application will be described below with reference to FIG. 6. In the embodiment shown in FIG. 6, the audio terminal is a smart speaker box, the server is a Duer cloud server, and the video display device is a television connected to a smart speaker box via a TV Guo.

(1) A user performs voice interaction with a smart speaker box, and expresses requirements regarding on-demand video to the smart speaker box through voice;

(2) After receiving a voice instruction from the user, the smart speaker box checks the connection state of the smart speaker box and sends an instruction including a language instruction and the connection state to the Duer cloud server for processing. The Duer cloud server makes different strategies for different states. For example, if the instruction="Black Cat Sergeant", the Duer cloud server will return audio content in a case that the speaker box is not connected to a TV fruit, and will return video-on-demand content in a case that the speaker box is connected to the TV fruit;

(3) The Duer cloud server returns the parsed and searched results to the speaker box;

(4) The smart speaker box sends an instruction to the TV Guo equipment, so as to control the operation of the TV Guo;

(5) The TV Guo obtains video resources from a video server according to the received instruction;

(6) After obtaining playing resources from the video server, the TV Guo projects the same on the TV screen to play the target video resources.

Figure 7:
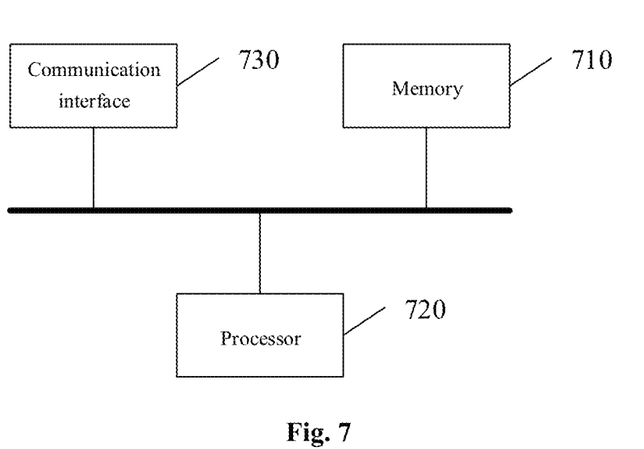
FIG. 7 is a schematic diagram of an information exchanging device according to an embodiment of the present application.

FIG. 7 shows an information exchanging device according to an embodiment of the present application. As shown in FIG. 7, the device includes a memory 710 and a processor 720. The memory 710 stores a computer program executable on the processor 720. When the processor 720 executes the computer program, the information exchanging method in the foregoing embodiment is implemented. The number of the memory 710 and the processor 720 may be one or more.

The device also includes: a communication interface 730 configured to communicate with external devices and exchange data; and a memory 710 which may include a high-speed RAM memory and may also include a non-volatile memory, such as at least one magnetic disk memory.

If the memory 710, the processor 720, and the communication interface 730 are implemented independently, the memory 710, the processor 720, and the communication interface 730 may be connected to each other through a bus and communicate with each other. The bus may be an ISA (Industry Standard Architecture) bus, a PCI (Peripheral Component) bus, an EISA (Extended Industry Standard Component) bus, or the like. The bus can be divided into an address bus, a data bus, a control bus, and the like. For ease of illustration, only one bold line is shown in FIG. 7, but it does not mean that there is only one bus or one type of bus.

Optionally, in a specific implementation, if the memory 710, the processor 720, and the communication interface 730 are integrated on one chip, the memory 710, the processor 720, and the communication interface 730 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that can contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium can even be paper or other suitable medium upon which the program can be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module can be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. An information exchanging method, applied to an audio terminal, wherein the method comprises:

receiving an input instruction from a user;
generating a content request message according to the input instruction and a connection state identifier of the audio terminal, and sending the content request message to a server, wherein the connection state identifier indicates whether the audio terminal is connected to a video display device;
receiving a content request response message returned by the server;
wherein the receiving a content request response message returned by the server comprises:
receiving only information of audio resources returned by the server in a case that the connection state identifier indicates that the audio terminal is not connected to the video display device, wherein the audio resources are obtained by server searching in pre-stored audio resources; and
receiving information of video resources returned by the server in a case that the connection state identifier indicates that the audio terminal is connected to the video display device, wherein the video resources are obtained by server searching in pre-stored video resources, and in a case that a plurality of video resources are searched, the information of video resources comprises a video list with the plurality of video resources.

2. The information exchanging method according to claim 1, wherein in a case that the connection state identifier indicates that the audio terminal is connected to the video display device, the method further comprises:
sending the received information of video resources to the video display device, wherein the video display device obtains video resources from a video server according to the information of video resources.

3. The information exchanging method according to claim 1, wherein the video display device comprises any one of a smart TV, a television box, and a screen projection tool.

4. An information exchanging method, applied to a server, wherein the method comprises:
receiving a content request message from an audio terminal, wherein the content request message comprises an input instruction received by the audio terminal from a user and a connection state identifier for indicating whether the audio terminal is connected to a video display device;
searching the requested content in the server according to the content request message to obtain a search result;
generating a content request response message according to the search result, and sending the content request response message to the audio terminal;
wherein searching the requested content in the server according to the content request message to obtain a search result comprises:
searching only in pre-stored audio resources according to the input instruction of the user in a case that the connection state identifier indicates that the audio terminal is not connected to the video display device, to obtain a search result comprising only audio resources; and
searching in pre-stored video resource according to the input instruction of the user in a case that the connection state identifier indicates that the audio terminal is connected to the video display device, to obtain a search result comprising video resources, wherein in a case that a plurality of video resources are searched, the search result comprises a searched video list with the plurality of video resources.

5. An information exchanging device, comprising:
one or more processors; and
one or more memories storing one or more instructions and encoded with instructions that are executable by the one or more processors to:
receive an input instruction from a user;
generate a content request message according to the input instruction and a connection state identifier of an audio terminal, and send the content request message to a server, wherein the connection state identifier indicates whether the audio terminal is connected to a video display device;
receive a content request response message returned by the server;
wherein the instructions are further executable by the one or more processors to:
receiving only information of audio resources returned by the server in a case that the connection state identifier indicates that the audio terminal is not connected to the video display device, wherein the audio resources are obtained by server searching in pre-stored audio resources; and
receiving information of video resources returned by the server in a case that the connection state identifier indicates that the audio terminal is connected to the video display device, wherein the video resources are obtained by server searching in pre-stored video resources, and in a case that a plurality of video resources are searched, the information of video resources comprises a video list with the plurality of video resources.

6. The information exchanging device according to claim 5, wherein in a case that the connection state identifier indicates that the audio terminal is connected to the video display device, the instructions are further executable by the one or more processors to:
send the received information of video resources to the video display device, wherein the video display device obtains video resources from a video server according to the information of video resources.

7. An information exchanging device, comprising:
one or more processors; and
one or more memories storing one or more instructions and encoded with instructions that are executable by the one or more processors to:
receive a content request message from an audio terminal, wherein the content request message includes an input instruction received by the audio terminal from a user and a connection state identifier for indicating whether the audio terminal is connected to a video display device;
search the requested content in the server according to the content request message to obtain a search result;
generate a content request response message according to the search result, and send the content request response message to the audio terminal;
wherein the instructions are further executable by the one or more processors to:
search only in pre-stored audio resources according to the input instruction of the user in a case that the connection state identifier indicates that the audio terminal is not connected to the video display device, to obtain a search result comprising only audio resources; and
search in pre-stored video resource according to the input instruction of the user in a case that the connection state identifier indicates that the audio terminal is connected to the video display device, to obtain a search result comprising video resources, wherein in a case that a plurality of video resources are searched, the search result comprises a searched video list with the plurality of video resources.

8. An audio terminal, comprising:
one or more processors; and
memories for storing one or more programs,
wherein the one or more processors execute the one or more programs, to implement the method of claim 1.

9. A server, comprising:
one or more processors; and
memories for storing one or more programs,
wherein the one or more processors execute the one or more programs, to implement the method of claim 4.

10. A non-volatile computer-readable storage medium storing a computer program, wherein a processor executes the program, to implement the method according to claim 1.

11. A non-volatile computer-readable storage medium storing a computer program, wherein a processor executes the program, to implement the method according to claim 4.

* * * * *